UNITED STATES PATENT OFFICE.

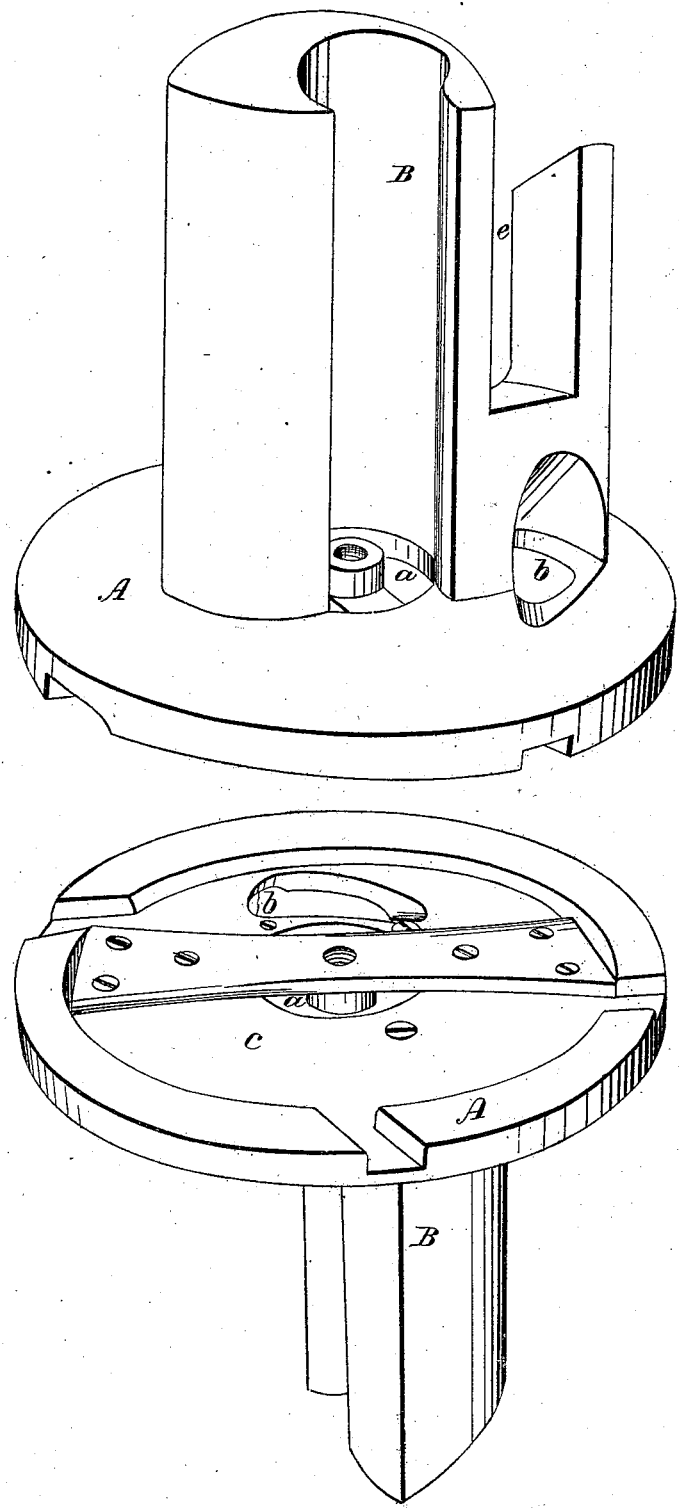

HAZEN WEBSTER, OF OGDENSBURG, NEW YORK.

CHURN.

Specification of Letters Patent No. 12,370, dated February 6, 1855.

*To all whom it may concern:*

Be it known that I, HAZEN WEBSTER, of Ogdensburg, county of St. Lawrence, State of New York, have invented a new and useful Machine for Producing Butter, called "Webster Air-Chest Agitator;" and I do hereby declare that the following is a full, clear, and exact description of the construction and operation of the same, reference being had to the annexed drawings, making a part of this specification, in which—

Figures 1 and 2 is a transverse section of this machine.

Letter A is a round open disk; with an open bottom made of wood or other metals; with the openings represented by the letters *a*, *b*, *c*.

B represents a spiral inclined air agitator of wood or other metals firmly attached to the open disk, A, with the sides terminating at a point near the center of the open disk, A, and diverging with a curve or circle toward the circumference of the open disk. This combination is placed in a square or circular box, and when disk A, is made to revolve, the disk, A, and the agitator B, not only moves, with its combination, but its peculiar form and construction is such that it breaks and moves the cream in every part of the chest equally from the bottom to the top, from the center to the circumference, of the chest; when the disk A, and the agitator, B, are made to revolve it opens a passage for the air down through the opening *a*, and so discharges from the bottom of the churn—in every part of the cream equally from the top to the bottom, through the agitator B, up through the letter *b*, in all parts of the churn, by this combination and its peculiar form there is a powerful agitation not equaled in any other churn, distributing the true elements, the atmospheric air with the oxygen—with an unequaled force, in all and every portion of the cream the agitator B, has an opening near the top letter (*c*) through which the cream passes coming in contact with the air that discharges through the agitator A, up through the letter (*b*) by this combination and peculiar form the cream is all agitated with one motion; with the various tests made with this peculiar combination and form—with various other churns in all trials, with an equal quantity and quality of cream, it produced some fifteen to twenty per cent more butter with a slow motion the agitator B, with its peculiar form, works and unites the butter together ready for salt, in from four to eight minutes.

I do not claim the device of a disk, rotating at the bottom of the churn tub upon a vertical axis, nor do I claim the use of tubular stem upon such a disk for admitting air beneath it, as these have been used before with the churn of S. P. Francisco, patented June 19th 1847; nor do I claim mounting an agitator upon such disk, as the same was proposed by said Francisco. But What I do claim, in combination with such rotating disk, is—

That form of the agitator which occupies the central portions of the disk and sweeps toward the circumference in a spiral shape with rounded angles, and is surmounted toward the circumference with one or more vertical breakers, and this I claim whether used with or without the air passages herein described.

Done this 18th day of January A. D. 1855.

HAZEN WEBSTER.

Witnesses:
C. W. BALDWIN,
S. W. SPERRY.